(12) United States Patent
Pelletier-Doyle et al.

(10) Patent No.: US 8,035,638 B2
(45) Date of Patent: Oct. 11, 2011

(54) COMPONENT SUPPRESSION IN MECHANICAL DESIGNS

(75) Inventors: Joseph E. Pelletier-Doyle, Northville, MI (US); Peter L. Maxfield, Portland, OR (US); Douglas Mullin, Portland, OR (US); Ashok B. Patil, Novi, MI (US); William K. Sterbenz, Bloomfield Township, MI (US); Lichao Yu, Northville, MI (US)

(73) Assignee: Autodesk, Inc., San Rafeal, CA (US)

( * ) Notice: Subject to any disclaimer, the term of this patent is extended or adjusted under 35 U.S.C. 154(b) by 733 days.

(21) Appl. No.: 11/555,106

(22) Filed: Oct. 31, 2006

(65) Prior Publication Data

US 2008/0024507 A1 Jan. 31, 2008

Related U.S. Application Data

(60) Provisional application No. 60/785,544, filed on Mar. 23, 2006.

(51) Int. Cl.
*G09G 5/00* (2006.01)
(52) U.S. Cl. .................. 345/419; 345/420; 345/427
(58) Field of Classification Search .................. 345/419, 345/420, 427
See application file for complete search history.

(56) References Cited

U.S. PATENT DOCUMENTS

| | | | | |
|---|---|---|---|---|
| 5,251,290 A * | 10/1993 | Pabon | | 345/420 |
| 5,485,390 A * | 1/1996 | LeClair et al. | | 700/182 |
| 5,905,501 A * | 5/1999 | Kato | | 345/420 |
| 5,980,084 A * | 11/1999 | Jones et al. | | 700/95 |
| 6,323,859 B1 * | 11/2001 | Gantt | | 345/419 |
| 6,571,146 B1 * | 5/2003 | Dennehy | | 700/98 |
| 6,725,184 B1 * | 4/2004 | Gadh et al. | | 703/2 |
| 6,792,398 B1 * | 9/2004 | Handley et al. | | 703/2 |
| 6,842,175 B1 * | 1/2005 | Schmalstieg et al. | | 345/427 |
| 7,519,449 B2 * | 4/2009 | Rhee et al. | | 700/182 |
| 2002/0018061 A1 * | 2/2002 | Gantt | | 345/419 |
| 2003/0085889 A1 * | 5/2003 | Chin et al. | | 345/419 |
| 2003/0112281 A1 * | 6/2003 | Sriram et al. | | 345/958 |
| 2003/0233626 A1 * | 12/2003 | Tsuruta et al. | | 716/10 |
| 2005/0071804 A1 * | 3/2005 | Miserocchi | | 717/104 |
| 2006/0038829 A1 * | 2/2006 | Morichi et al. | | 345/619 |
| 2006/0129271 A1 * | 6/2006 | Khurana et al. | | 700/182 |

* cited by examiner

*Primary Examiner* — Jin-Cheng Wang
(74) *Attorney, Agent, or Firm* — Patterson & Sheridan, LLP

(57) ABSTRACT

The complexity of a CAD model is reduced while its kinematic integrity is maintained by unloading certain data associated with the CAD model from the main memory of a computing device used in the design of the CAD model. The unloaded data includes graphics data and geometry data of those components of the CAD model that the user selects to suppress. The constraint data of the suppressed components are, however, retained in main memory so that the movements of the components of the CAD model can be modeled accurately. By unloading data from the main memory, the overall performance of the computing device is improved and also frees up memory resources for other uses.

18 Claims, 12 Drawing Sheets

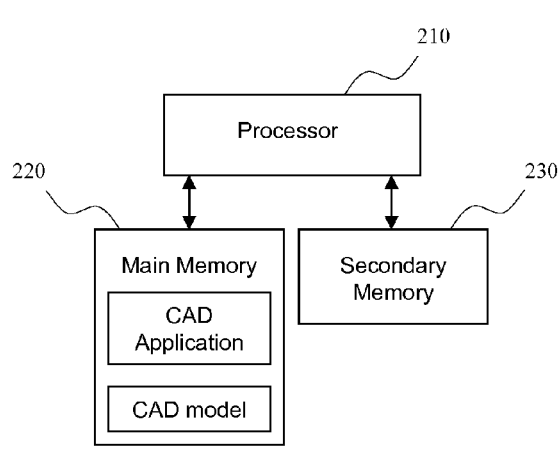
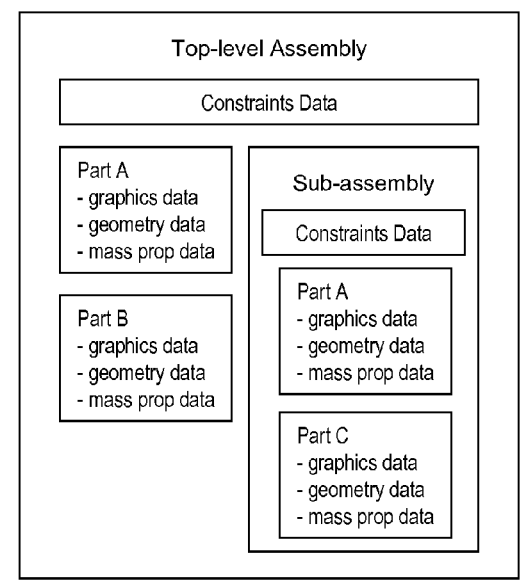
FIG. 2A
FIG. 2B

COMPONENT SUPPRESSION IN MECHANICAL DESIGNS

CROSS-REFERENCE TO RELATED APPLICATIONS

This application claims the benefit of U.S. Provisional Patent Application Ser. No. 60/785,544, entitled "Level of Detail, Multi-Sheet and Hidden Line," filed Mar. 23, 2006, the entire contents of which are incorporated by reference herein.

BACKGROUND OF THE INVENTION

1. Field of the Invention

The present invention generally relates to computer-aided design and, more particularly, to a method for reducing the complexity of computer-aided design models while maintaining the kinematic relationships of all the components.

2. Description of the Related Art

The term computer-aided design (CAD) generally refers to a broad variety of computer-based tools used by architects, engineers, and other construction and design professionals. CAD applications may be used to construct computer models representing virtually any real-world construct. For example, CAD applications are frequently used to create two-dimensional (2D) and three-dimensional (3D) models of mechanical devices. A popular CAD application that is used to construct 3D models of mechanical devices is the Autodesk® Inventor software application program.

3D models developed for mechanical designs can be extremely large and very complex, consisting of tens of thousands of individual elements, assemblies and constraints. Despite the speed and memory capacity of modern computers, large models can significantly degrade computer performance and response times. Moreover, their sheer complexity makes it difficult to navigate through the model space and to work with elements of interest.

A variety of techniques exist to reduce complexity and improve performance. The Autodesk® Inventor software application program, for example, allows users to make components invisible, making other parts of the model easier to visualize and navigate. This technique, however, does not improve computer performance and response times very much, because the components that are made invisible are still loaded into memory. Users may, on the other hand, elect to completely skip the loading of a component, but doing this destroys the kinematic integrity of the model.

SUMMARY OF THE INVENTION

The present invention provides a method for reducing the complexity of a CAD model while maintaining its kinematic integrity, and a computer readable medium comprising instructions that cause a computing device to perform this method. The reduction in the complexity of the CAD model is achieved by unloading certain data associated with the mechanical design from system memory of a computing device used in the design of the CAD model. The unloaded data includes graphics data and geometry data of those components of the CAD model that the user selects to suppress. By unloading such data from the system memory, the overall performance of the computing device is improved and also frees up memory resources for other uses.

The constraints data of the suppressed components are, however, retained in system memory so that the movements of the components of the CAD model can be modeled accurately. Other data of the suppressed components that may be retained in memory include mass properties data.

According to another aspect of the present invention, a usage meter for system memory allocated to a CAD application is provided and updated in real-time so that the user can monitor the system memory usage as he or she is reducing the complexity of the CAD model by suppressing components. In addition to the usage meter for the system memory, the user is also provided with indicators that show how many component occurrences (i.e., the total number of components regardless of whether they are unique or not) are currently in the CAD model and how many unique components are currently loaded into the CAD model.

In one embodiment, the suppressed components are not displayed in the graphics window. In another embodiment, the suppressed components are displayed in the graphics window as bounding boxes that are highlighted when they are selected. In still another embodiment, the suppressed components are displayed as substitute components which may be illustrated in varying degrees of complexity.

A CAD model with suppressed components may be saved as a representation object and imported into a larger assembly, and the larger assembly can associatively call upon the representation object of its child assemblies. Child assemblies are also permitted to have sub-assemblies with suppressed components and representation objects defined with respect thereto. Further, any of the representation objects of child assemblies may constitute substitute components.

BRIEF DESCRIPTION OF THE DRAWINGS

FIGS. 2A-2B schematically illustrate the contents of memory units of a computer system that is executing a CAD application in accordance with embodiments of the present invention.

DETAILED DESCRIPTION

Figure 1:
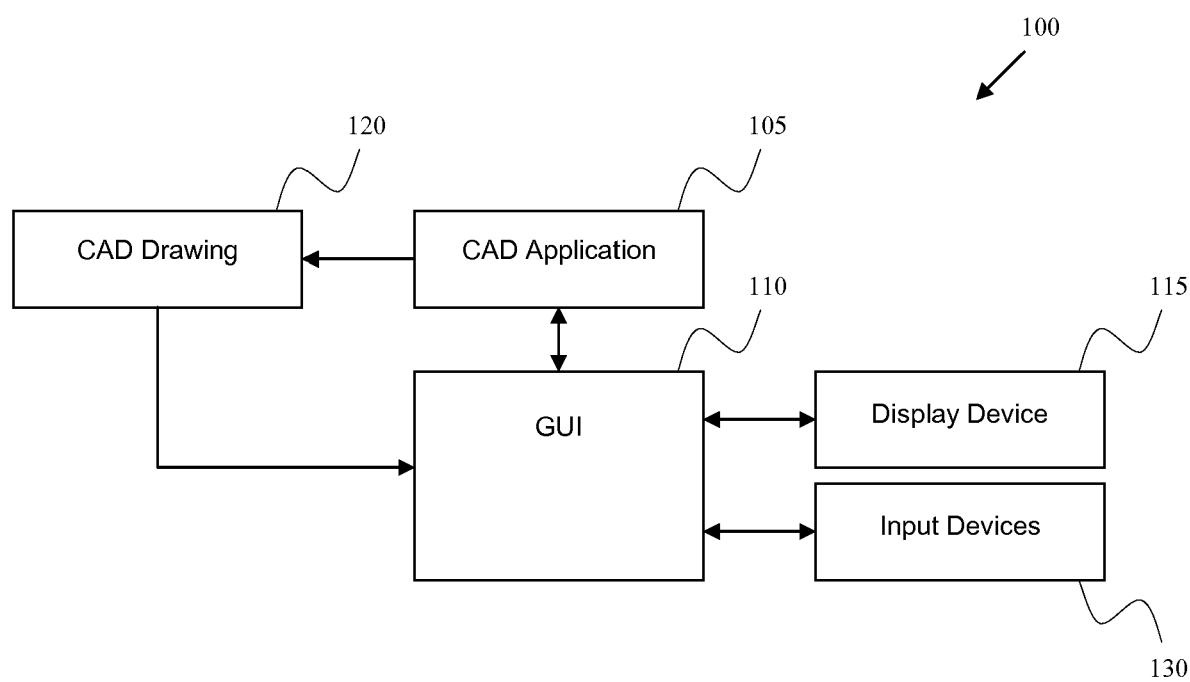
FIG. 1 is a conceptual block diagram of a computer system with which embodiments of the present invention can be practiced.

FIG. 1 is a conceptual block diagram of a computer system 100 with which embodiments of the present invention can be practiced. The components of the computer system 100 illustrated in FIG. 1 include CAD application 105, graphical user interface (GUI) 110, CAD drawing 120, user input devices 130, and a display device 115. CAD application 105 is a software application that is stored in memory and executed by the processor of the computer system 100. It includes software program routines or instructions that allow a user interacting with GUI 110 to create, view, modify and save CAD drawing or model 120. In the examples provided herein, the CAD application 105 is the Autodesk® Inventor software application program (Release 11) and associated utilities. Typically, user input devices 130 include a mouse and a keyboard, and display device 115 includes a CRT monitor or LCD display.

The configuration of the memory units of the computer system 100 is shown in FIG. 2A. The memory units are interfaced with a processor 210 and include a main memory 220 and a secondary memory 230. The main memory 220, also referred to as system memory or computer system memory, is typically configured as random access memory (RAM). The secondary memory 230 has slower access speeds than the main memory 220 and is typically configured as magnetic memory, such as a hard disk. When CAD application 105 is selected to be run on the computer system 100, a copy of CAD application 105 is retrieved from the secondary memory 230 and stored in the main memory 220. When a user opens CAD model 120 within CAD application 105, CAD model 120 is also stored in the main memory 220.

FIG. 2B schematically illustrates the contents of the main memory 220 when CAD model 120 is stored therein. The contents include constraints data for the top-level assembly of CAD model 120. The constraints data define motion constraint relationships between all of the components in the top-level assembly. The contents also include a dataset for each of the components of the top-level assembly. A component may be a part or a sub-assembly. The dataset for a part includes graphics data, geometry data, and mass properties data. The dataset for a sub-assembly includes constraints data for the sub-assembly and datasets for components that are in the sub-assembly.

In the example shown in FIG. 2B, the components of the top-level assembly include Parts A and B and a sub-assembly. The components of the sub-assembly include Parts A and C. Part A under the top-level assembly and Part A under the sub-assembly are different instances of the same component, Part A.

Figure 3:
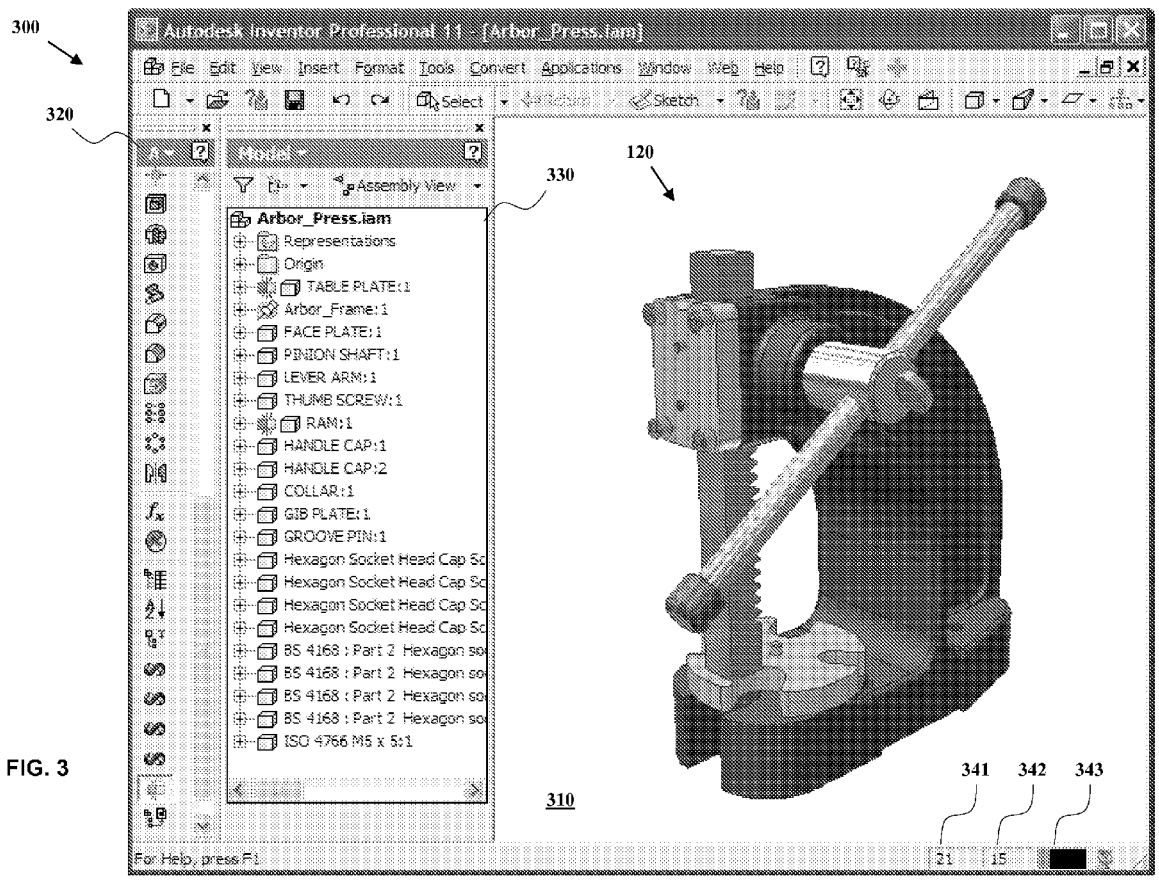
FIG. 3 illustrates a sample GUI using which suppressed components can be selected and organized.

The present invention provides GUI tools included in CAD application 105 for specifying components of CAD model 120 to be suppressed. A sample GUI according to an embodiment of the present invention is illustrated in FIG. 3. The GUI 300 includes a graphics window 310 in which CAD model 120 is displayed, and two GUI control panels comprising a tool panel 320 and a browser panel 330 that lists components of CAD model 120.

When CAD model 120 is opened, components of CAD model 120 are loaded into main memory. Some components, like "HANDLE CAP," are loaded once but may appear more than once in the graphics window 310. Each such instance of the component is referred to as a component occurrence. The GUI 300 provides an indicator 341 to signify the number of component occurrences existing in main memory, and an indicator 342 to signify the number of components loaded into main memory. The GUI 300 also provides indicator 343, which is a meter that displays the amount of main memory allocated to CAD application 105 that has been used up by the CAD model 120. The light region indicates the amount of consumed memory as a percentage of total memory available.

Figure 4A:
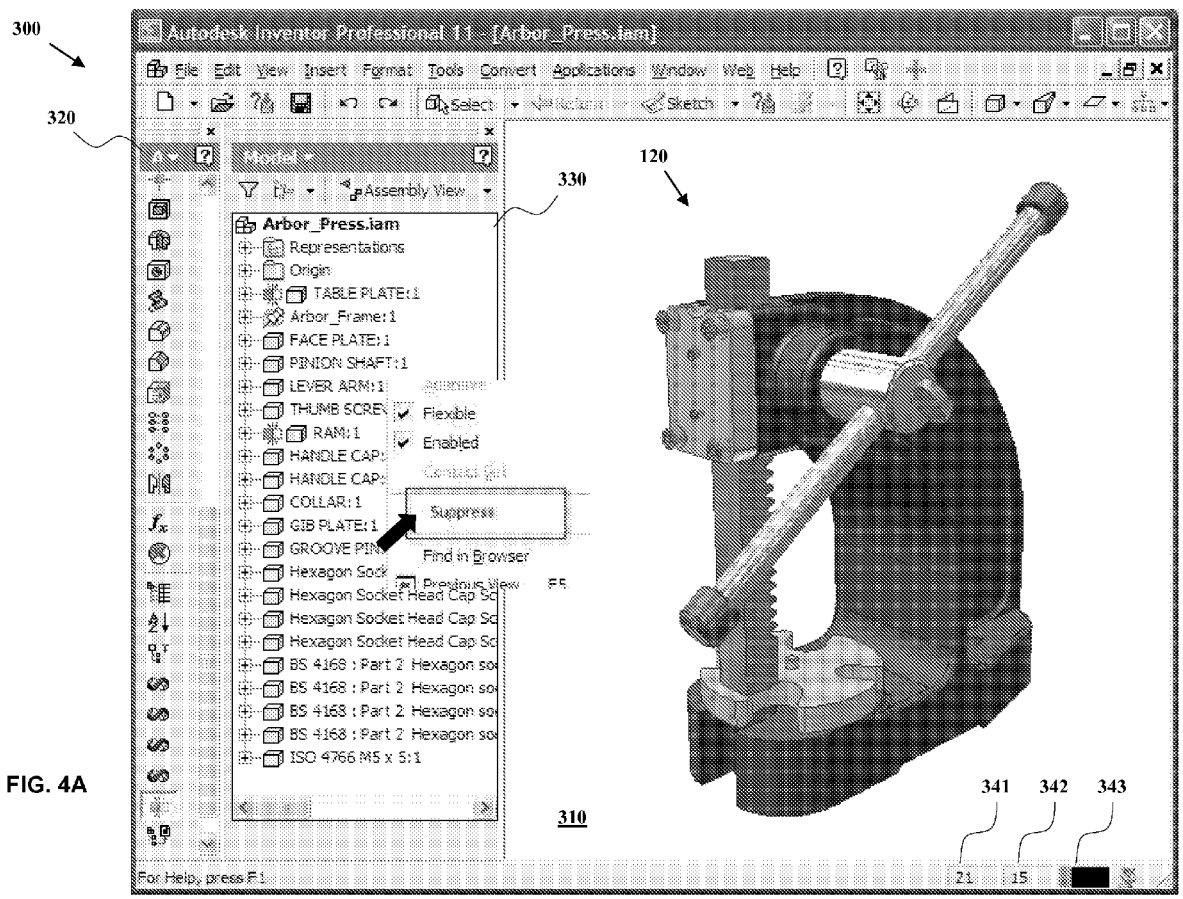
FIGS. 4A-4E illustrate the process of selecting a component to be suppressed and working with an assembly that has a suppressed component.

A component status, "Suppress," is provided as a way to limit the amount of data loaded for a given component. A component enters this status when a user selects the option "Suppress" on the component's context menu, which is brought up by a right-click of an input pointing device while the cursor of the input pointing device is positioned over the component. FIG. 4A shows the context menu for the component "LEVER ARM:1" and the selection of the option "Suppress" on this context menu.

Figure 4B:
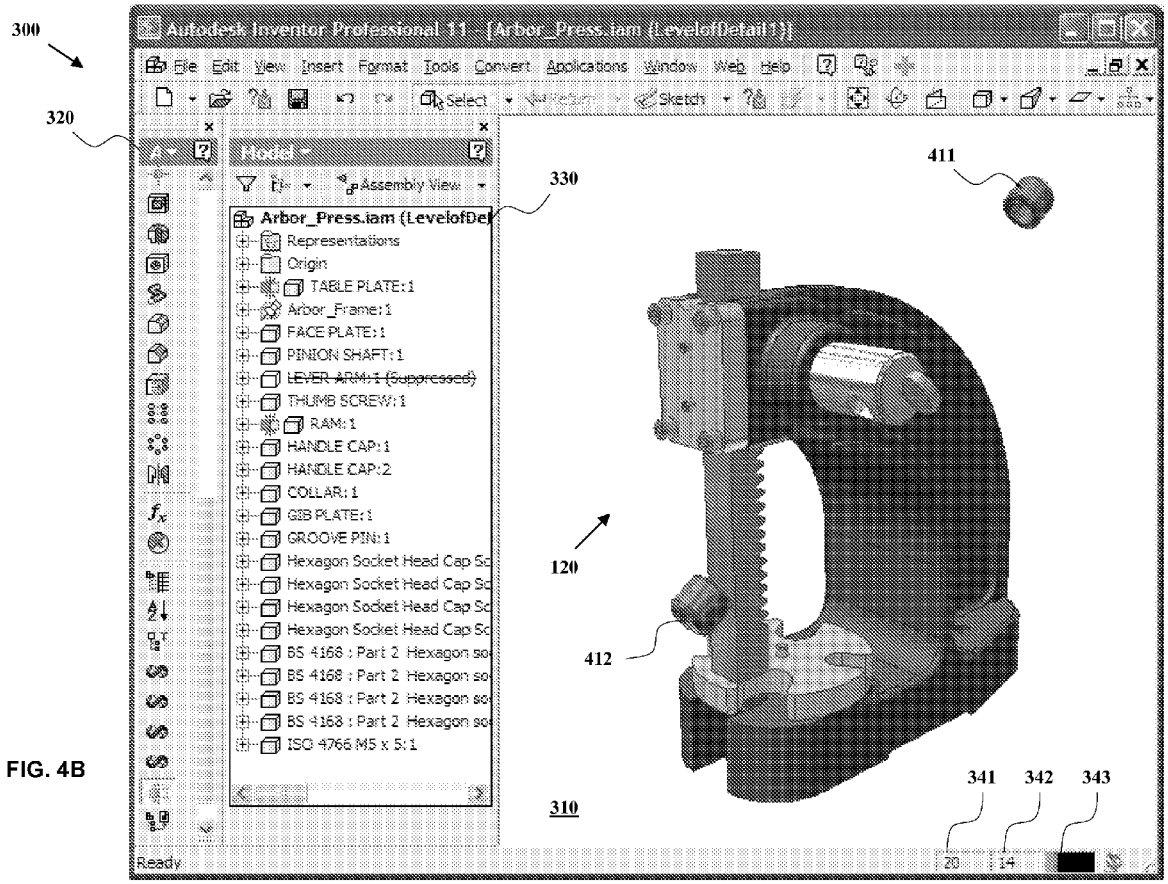

FIG. 4B shows the changes to the graphics window 310, the browser panel 330 and indicators 341, 342, 343 when a component is suppressed. First, the display of the lever arm which should appear between end caps 411, 412 is suppressed. Second, the component that has been suppressed is shown in the browser panel 330 with a line stricken through it and the text "(Suppressed)" appended to it. Third, indicator 341 is updated to show one less component occurrence, and indicator 342 is updated to show one less loaded component. Fourth, indicator 343 is updated to show an increase in the free memory bar and a decrease in the used memory bar. However, the free memory increase is so slight in this example that the change in indicator 343 is not evident from FIG. 4A to FIG. 4B.

When a component is suppressed, some of the component's data are unloaded from main memory. The unloaded data includes graphics data and geometry data. The retained data includes mass properties data and constraints data of the component that define the constraint relationships between the component and the other components in CAD model 120. The gain in free memory achieved by suppressing a component is the result of unloading that component's graphics data and geometry data from main memory.

Figure 4C:
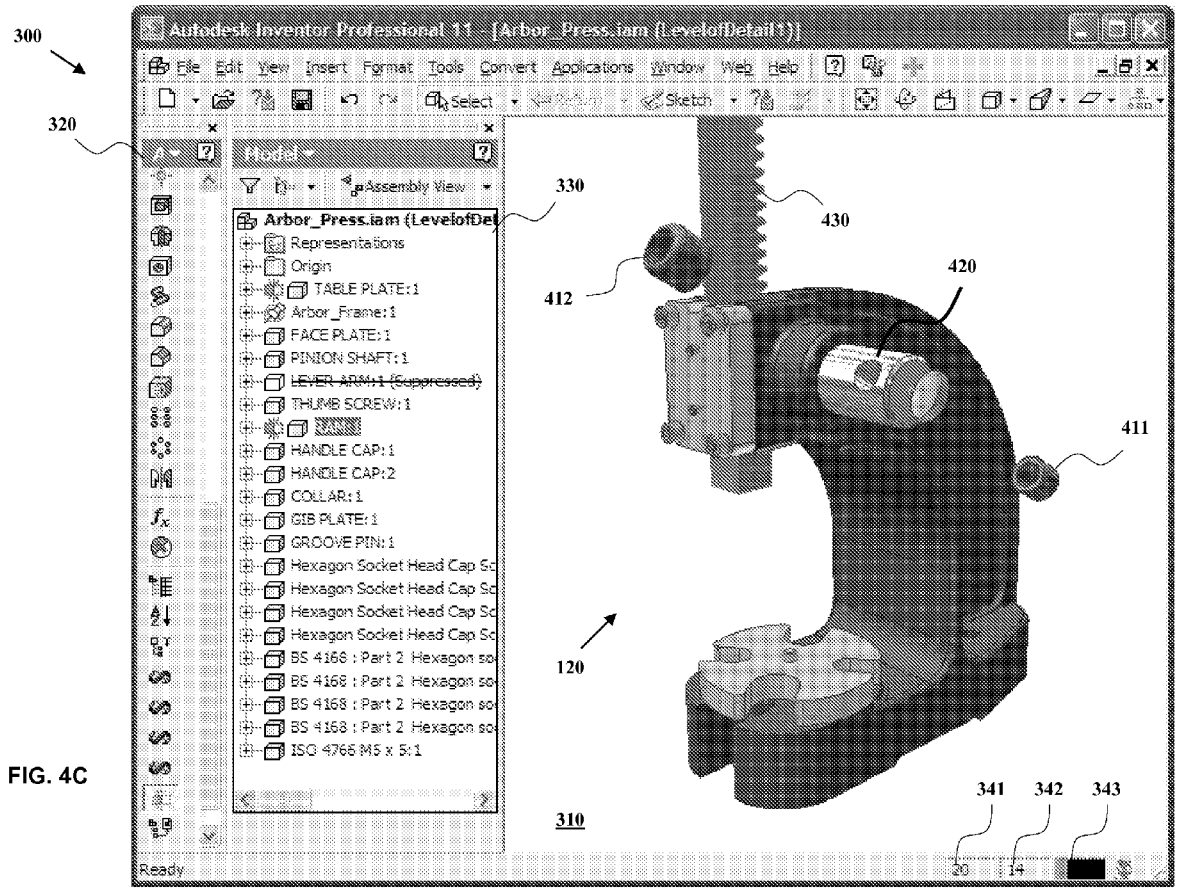

By retaining the constraints data of the suppressed component, CAD application 105 is able to accurately model the movements of the components relative to all of the other components. The accurate modeling of the movements of the components relative to the other components is reflected in FIGS. 4B and 4C. In FIG. 4B, end caps 411, 412 are in their initial positions. End caps 411, 412 are moved to a new position using an input pointing device (e.g., by clicking on one of end caps 411, 412 with the input pointing device and dragging it to a new position) and cause a rotation of pinion shaft 420 and a movement of ram 430 as shown in FIG. 4C.

Figure 4D:
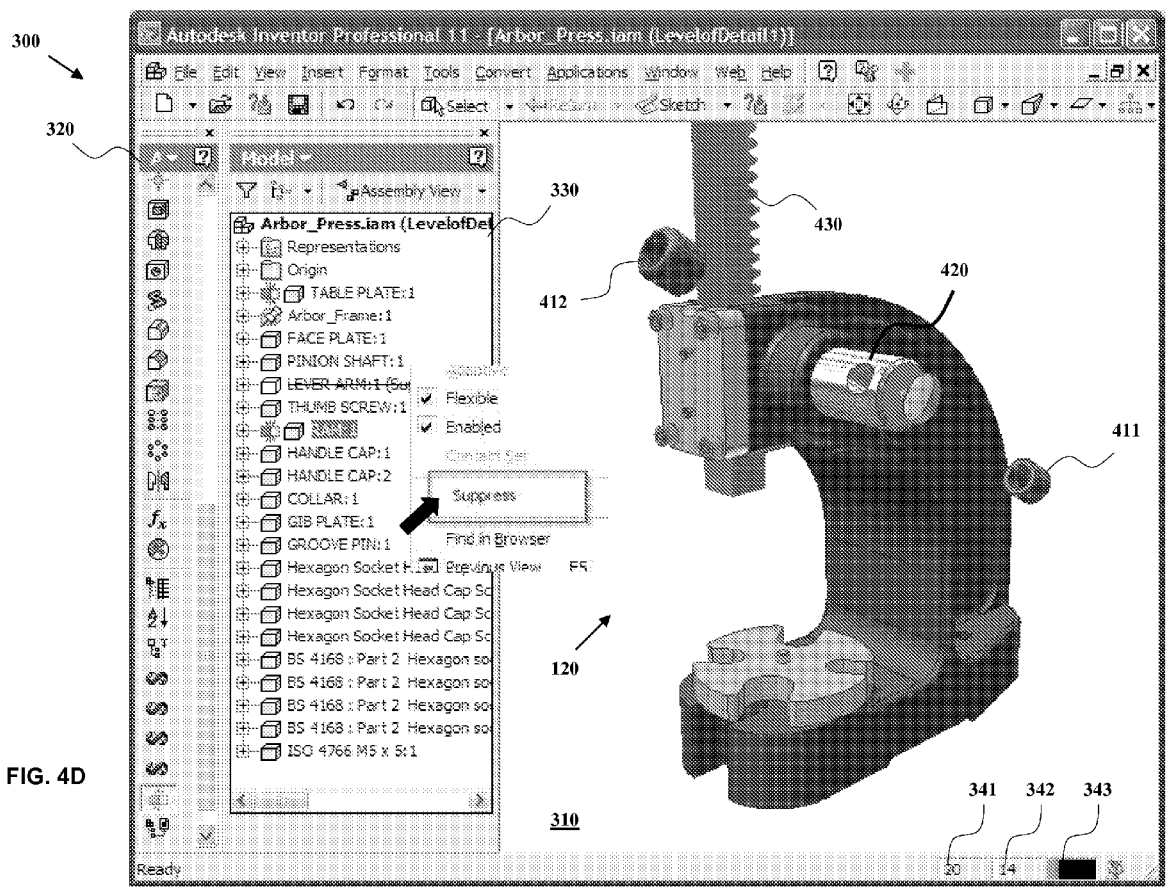
Figure 4E:
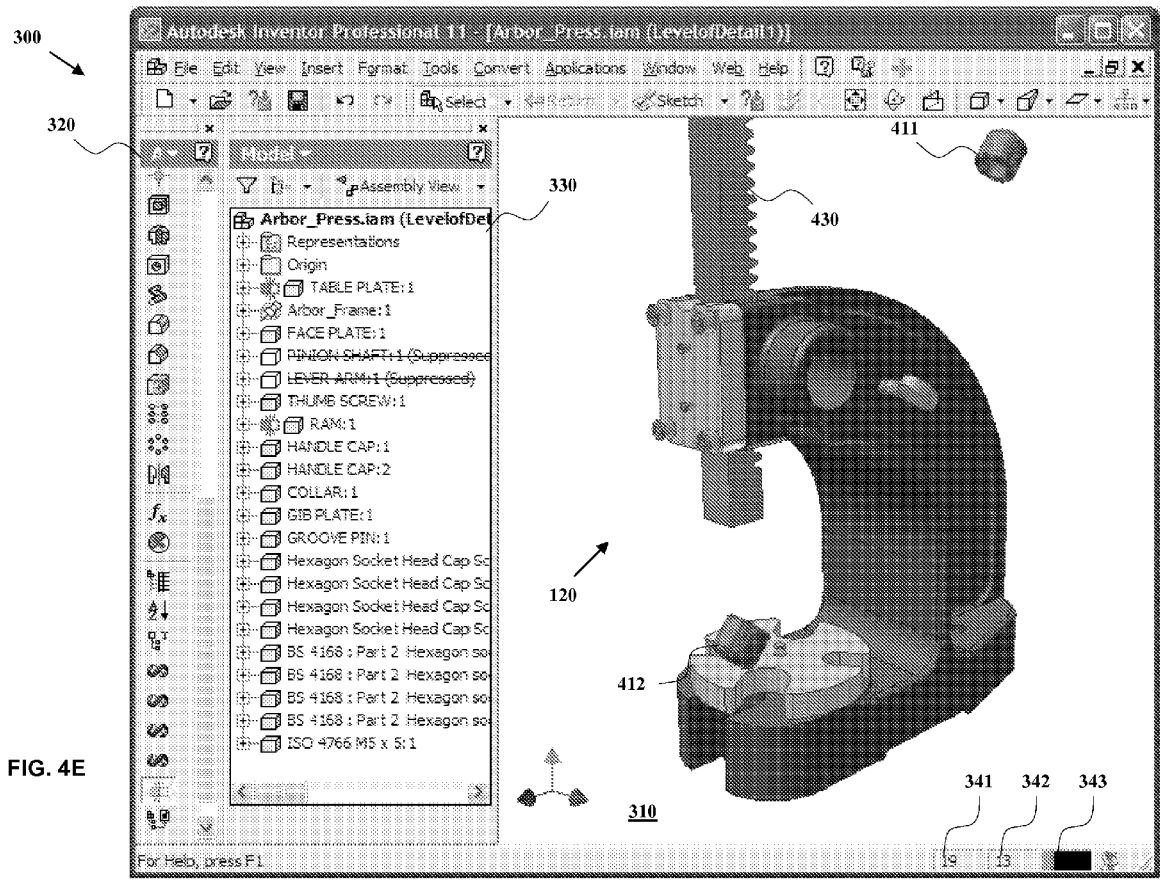

FIG. 4D shows the context menu for the component "PINION SHAFT:1" and the selection of the option "Suppress" on this context menu so as to cause the suppression of this component. FIG. 4E shows the changes to the graphics window 310, the browser panel 330 and indicators 341, 342, 343 when the pinion shaft component is suppressed. First, the display of the pinion shaft is suppressed. Second, the pinion shaft component is shown in the browser panel 330 with a line stricken through it and the text "(Suppressed)" appended to it. Third, indicator 341 is updated to show one less component occurrence, and indicator 342 is updated to show one less loaded component. Third, indicator 343 is updated to show an increase in the free memory bar and a decrease in the used memory bar. However, the free memory increase is again so slight in this example that the change in indicator 343 is not evident from FIG. 4D to FIG. 4E.

As a result of the pinion shaft component being suppressed, some of this component's data are unloaded from main memory. The unloaded data includes graphics data and geometry data. The retained data includes mass properties data and constraints data of this component that define the constraint relationships between this component and the other components in CAD model 120. The gain in free memory achieved by suppressing a component is the result of unloading this component's graphics data and geometry data from main memory. FIG. 4E also shows that end caps 411, 412 have moved to a new position to cause a movement of ram 430. The movement of the end caps also causes a rotation of the pinion shaft but this is not visible as the pinion shaft component has been suppressed.

Figure 5A:
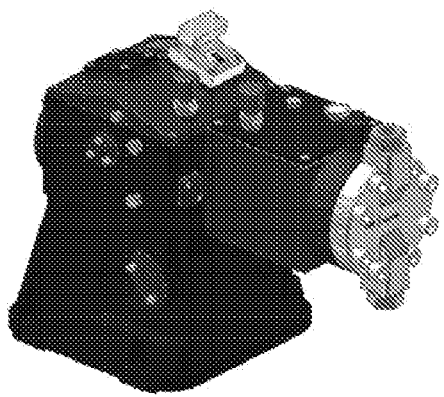
FIGS. 5A-5B respectively illustrate a sample CAD model with no suppressed components and the same CAD model has a suppressed component displayed as a bounding box.
Figure 5B:
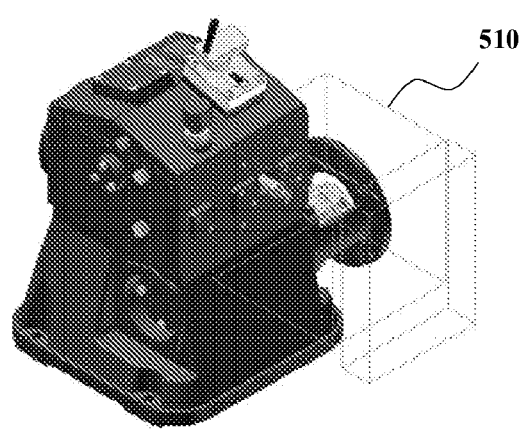

According to another embodiment of the present invention, a component that is suppressed may be displayed as a bounding box in the graphics window 310 when the component is selected in the browser panel 330. The bounding box assists the user in understanding where that component is in relation to visible components. The use of the bounding box is illustrated in FIGS. 5A-5B. FIG. 5A represents a CAD model with no components suppressed. FIG. 5B represents the same CAD model with a suppressed component. The suppressed component is displayed in FIG. 5B as a bounding box 510.

The browser panel 330 includes a representation toolset that allows access to a new representation type, Level of Detail (LOD). The LOD representation allows the user to define and save an assembly with suppressed components, so that it can be recalled and reused easily. For example, after having created and saved an LOD representation for an assembly, the user can import that LOD representation into a larger assembly. In an embodiment of the present invention illustrated herein, four default LOD representations can be created with any new assembly. They include:

Master: All components are loaded.
All Components Suppressed: CAD model assembly is opened with no children components loaded at all.
All Parts Suppressed: All components that are assemblies are loaded, but components that are parts are not loaded, so that the user can get a quick view of the assembly structure from the browser panel.
All Content Center Suppressed: All content library components, e.g., bolts, nuts and washers, are suppressed.

Figure 6A:
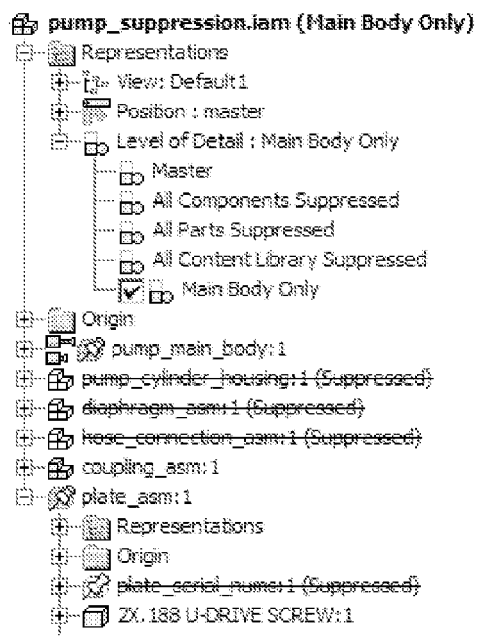
FIGS. 6A-6B illustrate a sample browser panel with various "Level of Detail" representation nodes.

FIG. 6A is a sample browser panel that includes the four default LOD representations. In FIG. 6A, however, none of the four default LOD representations has been selected by the user. Instead, a user-defined LOD representation, "Main Body Only," has been selected by the user. The components that are suppressed are all part of the main body and include: pump_cylinder_housing:1, diaphragm_asm:1, and hose_connection_asm:1.

When a component is suppressed, and CAD application 105 detects other occurrences of the same component in session which remain fully loaded, a prompt is presented to the user to indicate that memory savings will only be realized if all occurrences of the same component are suppressed. The message may read: "One or more occurrences of the selected component remain unsuppressed. To gain capacity improvements, please suppress all occurrences of this selected component."

Figure 6B:
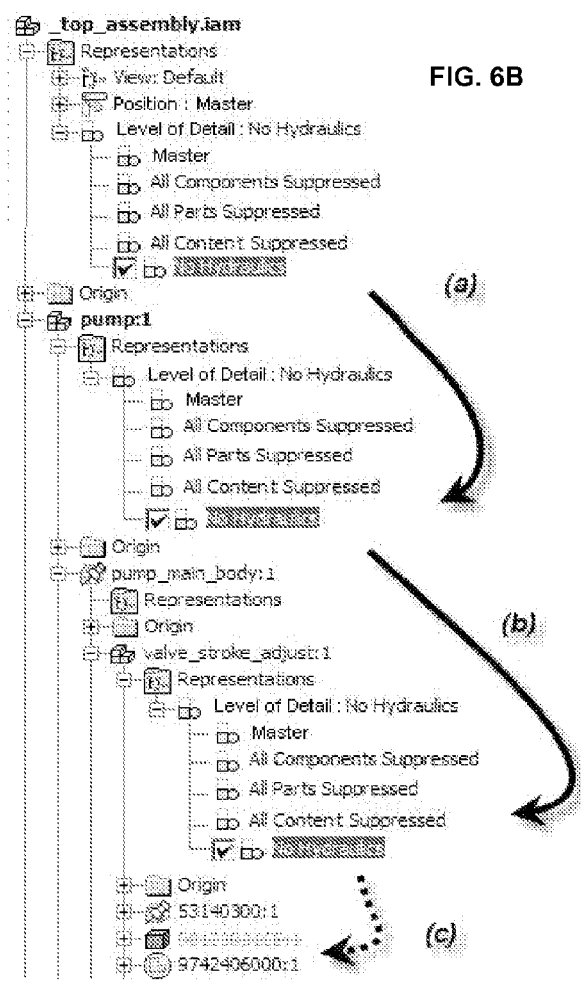

An assembly can associatively call upon an LOD representation from a child sub-assembly (at any depth). This is illustrated in FIG. 6B. In FIG. 6B, there are two nested LOD representations. The top assembly has an LOD representation "No Hydraulics" which is pointing to an LOD representation of the same name from the immediate child sub-assembly, "pump:1." In turn, the LOD representation in "pump:1" is referencing an LOD representation of the same name in the sub-assembly, "valve_stroke_adjust:1." It is this final LOD representation which governs the suppression status of all children below "valve_stroke_adjust:1."

An assembly may be represented as a substitute component. A substitute component is a component which is loaded in the place of the assembly and typically has all of the child components of the assembly suppressed. The substitute component enhances the user's ability to visualize the interaction of components without paying the performance penalty of loading an editable version into main memory. Substitute components can be user-developed geometry, or automatically created by the computer system, for example, by performing a Boolean operation on all the parametrically developed pieces of the component.

Figures 7A, 7B:
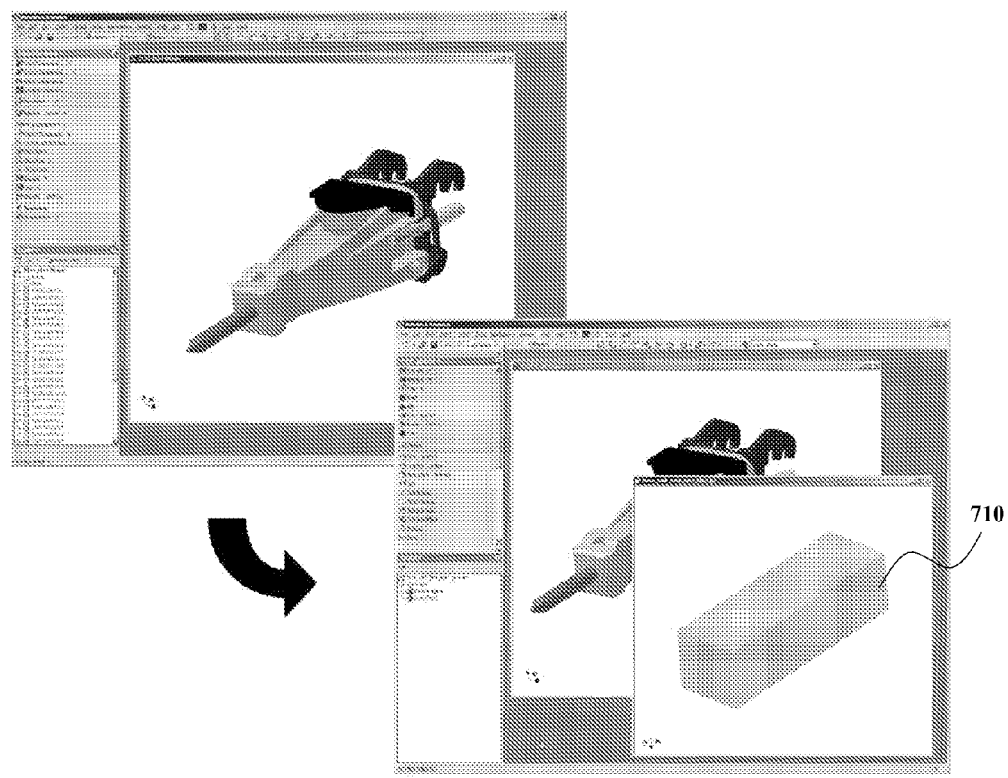
FIGS. 7A-7B respectively illustrate a sample CAD model with no suppressed components and the same CAD model represented with a substitute component.

FIG. 7A illustrates an assembly with no components suppressed. FIG. 7B illustrates a substitute component for the assembly in FIG. 7A with all of child components of that assembly suppressed. The substitute component in FIG. 7B is represented by a bounding box 710. In those cases where the user may desire less simplification, the user can unsuppress some of the child components of the assembly. A substitute component is managed through the browser panel 330, and may be deleted, opened for editing or updating, or copied.

The substitute component created in the manner described above may be placed into a larger assembly. The substitute status of a component is occurrence based, and thus it is possible to load a substitute component for several occurrences of a given assembly in a larger assembly, but load the master LOD representation in another instance. When this happens, a prompt is presented to the user to indicate that memory savings from the substitute component will only be realized if all occurrences of the same component are substituted.

Figure 8:
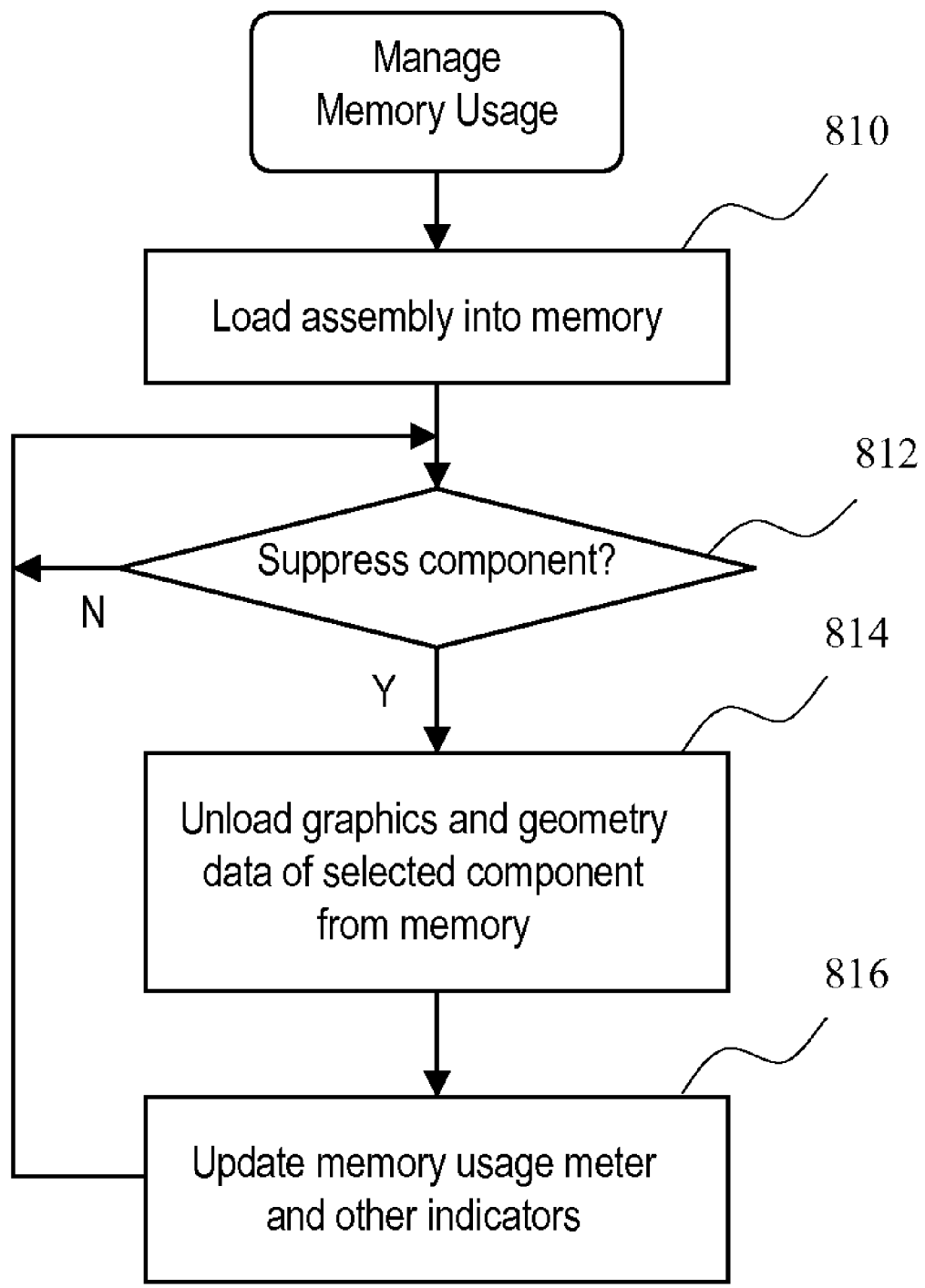
FIG. 8 is a flow diagram that illustrates the steps carried out to manage usage of computer system memory according to an embodiment of the present invention.

FIG. 8 is a flow diagram that illustrates the steps carried out by a computer system that is hosting CAD application 105 to manage the usage of system memory or main memory of the computer system, according to an embodiment of the present invention. In step 810, an assembly of a CAD model is loaded into system memory. After the assembly is loaded, CAD application 105 monitors inputs made through the browser panel 330 and checks if any of the inputs are for suppressing a component of the assembly (step 812). If there is an input for suppressing a component of the assembly, the graphics and geometry data of the selected component are unloaded from system memory (step 814). The constraints data and the mass properties data, on the other hand, are not unloaded and retained in the system memory. In step 816, the memory usage meter and the other indicators for component occurrences and loaded components are updated. The flow then returns to step 812 where CAD application continues to check for inputs for suppressing other components. The assembly with one or more suppressed components can be saved at any time through the browser panel 330. It can also be copied into a larger assembly as a component or sub-assembly of the larger assembly.

While the foregoing is directed to embodiments of the present invention, other and further embodiments of the invention may be devised without departing from the basic scope thereof, and the scope thereof is determined by the claims that follow.

What is claimed is:

1. A method of managing computer resources used by a computing device that includes a processor configured to execute a computer-aided design (CAD) application stored in a system memory, the method comprising the steps of:
  loading a CAD model into the system memory of the computing device, wherein the CAD model includes a plurality of components and represents an assembly;
  displaying on a display device a representation of the CAD model;
  receiving a selection from a user to suppress at least one component included in the CAD model, wherein the at least one component includes graphics data, constraints data, and mass properties data that are loaded into the system memory, wherein the constraints data and the mass properties data define relationships between the at least one component and other components included in the CAD model;

in response to receiving the selection, unloading by the processor the graphics data of the at least one component from the system memory, but not unloading from the system memory the constraints data and the mass properties data of the at least one component, wherein an amount of free memory associated with the system memory is increased as a result of unloading the graphics data related to the at least one component from the system memory; and displaying on the display device an updated representation of the CAD model based on the unloaded graphics data of the at least one component.

2. The method according to claim 1, wherein the constraints data of the at least one component defines constraint relationships between the at least one component and another component in the CAD model.

3. The method according to claim 1, further comprising the step of saving an updated CAD model in a secondary memory with one or more components of the updated CAD model being suppressed.

4. The method according to claim 3, further comprising the step of incorporating the updated CAD model with the one or more suppressed components into another CAD model.

5. The method according to claim 1, further comprising the step of displaying a usage meter for the system memory, the usage meter being updated after the step of unloading.

6. The method according to claim 1, further comprising the step of displaying on the display device substitute graphics for the at least one component in the updated representation.

7. The method according to claim 1, further comprising the step of prompting the user to suppress another component, wherein the another component and the at least one component comprise multiple occurrences of the same component.

8. The method according to claim 1, further comprising the step of displaying on the display device selectable options to allow the user to suppress none of the components in the CAD model, to suppress all of the components in the CAD model, or to suppress all parts of all of the components in the CAD model.

9. A non-transitory computer-readable medium storing instructions that, when executed by a processor, cause a computing device to manage computer resources used by computing device, by performing the steps of:

loading a computer-aided design (CAD) model into a system memory of the computing device, wherein the CAD model includes a plurality of components and represents an assembly;

displaying on a display device a representation of the CAD model;

receiving a selection from a user to suppress at least one component included in the CAD model, wherein the at least one component includes graphics data, constraints data, and mass properties data that are loaded into the system memory, wherein the constraints data and the mass properties data define relationships between the at least one component and other components included in the CAD model;

in response to receiving the selection, unloading the graphics data of the at least one component from the system memory, but not unloading from the system memory the constraints data and the mass properties data of the at least one component, wherein an amount of free memory associated with the system memory is increased as a result of unloading the graphics data related to the at least one component from the system memory; and displaying on the display device an updated representation of the CAD model based on the unloaded graphics data of the at least one component.

10. The computer-readable medium according to claim 9, wherein the constraints data of the at least one component defines constraint relationships between the at least one component and another component in the CAD model.

11. The computer-readable medium according to claim 9, further comprising the step of saving an updated CAD model in a secondary memory with one or more components of the updated CAD model being suppressed.

12. The computer-readable medium according to claim 11, further comprising the step of incorporating the updated CAD model with the one or more suppressed components into another CAD model.

13. The computer-readable medium according to claim 9, further comprising the step of displaying a usage meter for the system memory, the usage meter being updated after the step of unloading.

14. The computer-readable medium according to claim 9, further comprising the step of displaying on the display device substitute graphics for the at least one component in the updated representation.

15. The computer-readable medium according to claim 9, further comprising the step of prompting the user to suppress another component, wherein the another component and the at least one component comprise multiple occurrences of the same component.

16. The computer-readable medium according to claim 9, further comprising the step of displaying on the display device selectable options to allow the user to suppress none of the components in the CAD model, to suppress all of the components in the CAD model, or to suppress all parts of all of the components in the CAD model.

17. A computing device, comprising:
a display device;
a processor; and
a memory storing instructions that, when executed by the processor, are configured to manage computer resources of computing device by:

loading a computer-aided design (CAD) model into the memory, wherein the CAD model includes a plurality of components and represents an assembly, displaying on the display device a representation of the CAD model, receiving a selection from a user to suppress at least one component included in the CAD model, wherein the at least one component includes graphics data, constraints data, and mass properties data that are loaded into the system memory, wherein the constraints data and the mass properties data define relationships between the at least one component and other components included in the CAD model, in response to receiving the selection, unloading the graphics data of the at least one component from the memory, but not unloading from the memory the constraints data and the mass properties data of the at least one component, wherein an amount of free memory associated with the system memory is increased as a result of unloading the graphics data related to the at least one component from the system memory, and displaying on the display device an updated representation of the CAD model based on the unloaded graphics data of the at least one component.

18. The computing device according to claim 17, wherein the at least one component further includes mass properties data, and wherein the instructions, when executed by the processor, are further configured to, in response to receiving the selection, not unload from the memory the mass properties data of the at least one component.

* * * * *